Aug. 29, 1939.  G. M. KOCH  2,171,216
CATHODE RAY ELECTRICAL MEASURING DEVICE
Filed July 1, 1938
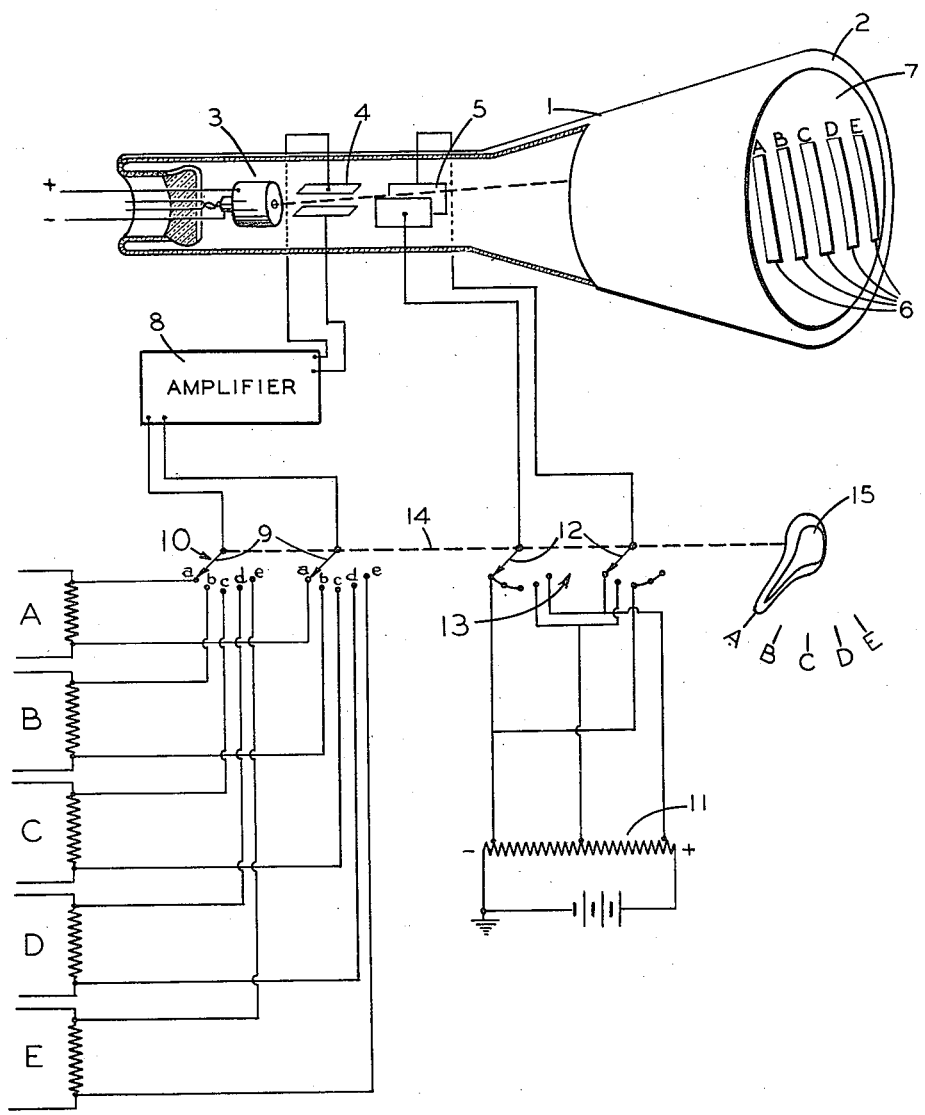
INVENTOR.
GEORGE M. KOCH.
BY Charles McClair
ATTORNEY Patented Aug. 29, 1939

2,171,216

UNITED STATES PATENT OFFICE

2,171,216

CATHODE RAY ELECTRICAL MEASURING DEVICE

George M. Koch, Summit, N. J., assignor, by mesne assignments, to Radio Corporation of America, New York, N. Y., a corporation of Delaware Application July 1, 1938, Serial No. 217,104

2 Claims. (Cl. 171—95)

My invention relates to electrical measuring means, particularly to a cathode ray tube device for indicating a plurality of electrical quanta.

In the manufacture of electrical apparatus a series of electrical measurements are usually made in rapid succession on each completed piece of apparatus. In the manufacture of radio tubes, for example, each tube is tested among other things for emission current, for gas current, for mutual conductance, for cut-off voltage, and for plate current, each measurement being made on one of a series of instruments, such as voltmeters, arranged on a table before the operator. Each instrument is successively connected to a voltage representing the tube condition to be indicated, and the operator must read the instruments in succession as the successive connections are made. In high speed manufacture the rapid testing of the apparatus becomes tedious and often retards production.

An object of my invention is electrical measuring means employing a cathode ray tube for visually indicating on a single viewing surface, in rapid succession, a plurality of electrical quanta.

The characteristic features of my invention are defined with particularity in the appended claims and one embodiment is described in the following specification and in the accompanying drawing which shows diagrammatically a cathode ray tube and associated circuits.

The several electrical quanta to be measured are visually indicated on the fluorescent screen of the conventional cathode ray tube 1 comprising a fluorescent screen 2, and electron gun 3 for projecting an electron beam to the screen to produce a spot of light on the screen. The electron beam is deflected in a vertical direction by deflection electrodes 4 and is deflected in a horizontal direction by deflection electrodes 5. An undulatory wave, such as alternating or pulsating current, that is proportional in amplitude to the quanta to be measured is impressed on the vertical deflection plates to oscillate the light spot and produce a continuous straight line the length of which is proportional to the amplitude of the wave and the quanta measured. Each electrical quantum to be measured, then, is represented by a vertical luminescent line on the screen of the tube. When a different quantum is measured the vertical line shifts to a new position parallel to the first position, each quantum being quantitatively represented by the length of line appearing on the screen. To easily distinguish the line in its different positions a mask 7 may be placed over the end of the screen with parallel vertical slits or windows 6 in registry with the area on which the line appears. The mask may comprise an opaque coating of paint or a paper or cardboard templet placed on the screen. A static bias on horizontal deflection plates 5 determines the window in which the light line appears.

The several voltages to be tested are here represented by potential drops across resistors A, B, C, D and E, each connected in the particular circuit to be tested, the ends of the resistors being coupled through amplifier 8 to vertical deflection plates 4. Voltages at A, B, C, D or E, preferably of alternating current, are selectively connected to the vertical deflection plates through the movable poles 9 of the double pole multi-contact switch 10. The light line on the screen representing each of the several voltages is moved to its proper window in the mask by an adjustable direct current bias applied to the horizontal deflection plates 5. The biasing means comprises a resistor 11 carrying a direct current and tapped at several points as indicated with the poles 12 of the double pole multi-contact switch 13 connected to the deflection plates and movable into contact with the desired taps on the potentiometer. The armatures of the multi-pole switches are interlocked with a shaft 14 common to all of the switch poles.

Assume it is desired to rapidly and successively indicate the voltages across resistors A, B, C, D and E. By turning controller handle or knob 15 on the interlock shaft to position A, switch 10 couples resistor A to vertical deflection plates 4 and switch 13 connects horizontal deflection plates 5 to the proper taps on the biasing resistor 11 to bring the cathode beam to window A on the screen. The length of the light line in this window gives an immediate indication of the voltage across resistor A, zero voltage being represented by a dot, preferably at one end of the window. By moving the controller handle to the next adjacent position, resistor B is coupled to the vertical deflection plates and the horizontal bias moves the spot to the next window B, on the screen. Each succeeding voltage is indicated in its corresponding window and all of the voltages may be rapidly observed by moving the controller successively to each of its several positions.

With an electrical measuring device constructed according to my invention several voltages may be quickly observed on the screen 2 of the cathode ray tube and the time consumed in focusing the eye upon a series of different electrical instruments is obviated. There is no inertia in the electron beam, corresponding to the mechanical inertia of a conventional moving coil meter, and the luminescent line appears in the appropriate window the instant the voltage to be indicated is connected to the deflection electrodes. Good results have been obtained with a cathode ray tube of the type commercially known as the 905, and with 300 volts across resistor 11, and 2000 volts on the accelerating electrode of the electron gun. The size of each of the resistors at A, B, C, D and E is adjusted to the current it carries to impress .25 volt on the input of the amplifier. Magnetic deflecting means could, of course, be used if desired. My improved electrical measuring device is particularly useful in testing apparatus such as radio tubes, is inexpensive to construct, and easy to operate.

I claim:

1. A device for measuring a plurality of unknown voltages, comprising a cathode ray tube with a screen light sensitive to electron bombardment and an electron gun for projecting an electron beam on said screen, means for deflecting said beam vertically, means for deflecting said beam horizontally, a switch for selectively applying said unknown voltages to the vertical deflecting means, a direct current voltage source, a second switch mechanically interlocked with the first switch for applying a different and predetermined steady direct current voltage from said source to the horizontal deflecting means for each unknown voltage applied to the vertical deflecting means.

2. In combination in a device for measuring a plurality of unknown voltages, a cathode ray tube with a screen of material which fluoresces when bombarded with electrons and means for projecting a beam of electrons on said screen, horizontal deflecting means for said beam, a direct current voltage source connected to the horizontal deflecting means for impressing on the beam a predetermined steady deflecting field, switch means in circuit with said source for selectively changing step-by-step the value of the direct current voltage of said source impressed on said deflecting means and for instantaneously changing the intensity of the horizontal deflecting field from the predetermined steady value of one step to the predetermined steady value of another step, vertical deflecting means for said beam, a second switch means for selectively impressing a plurality of voltages proportional in amplitude to the voltages to be measured on said vertical deflecting means to deflect the beam in a vertical direction, and switch interlocking means for impressing a different predetermined steady horizontal deflecting field on said beam for each unknown voltage impressed upon the vertical deflecting means.

GEORGE M. KOCH.